Dec. 8, 1931.   J. KLINE ET AL   1,835,310
FISHING ROD APPARATUS
Filed June 6, 1929
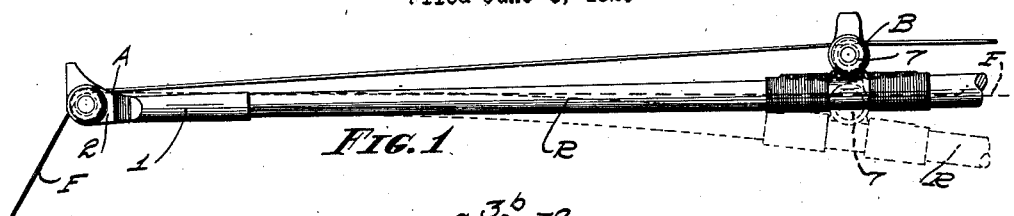
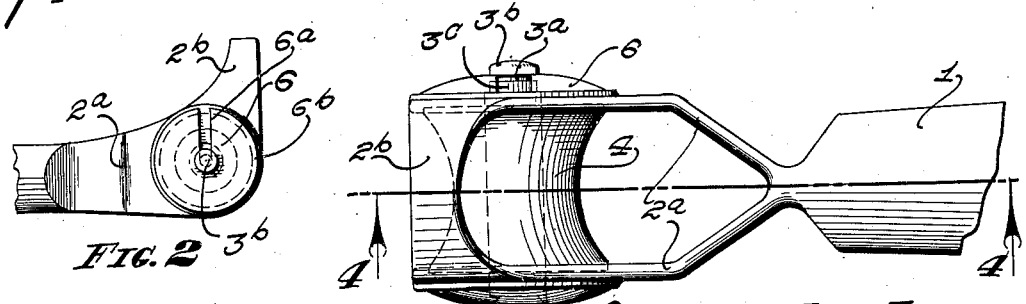
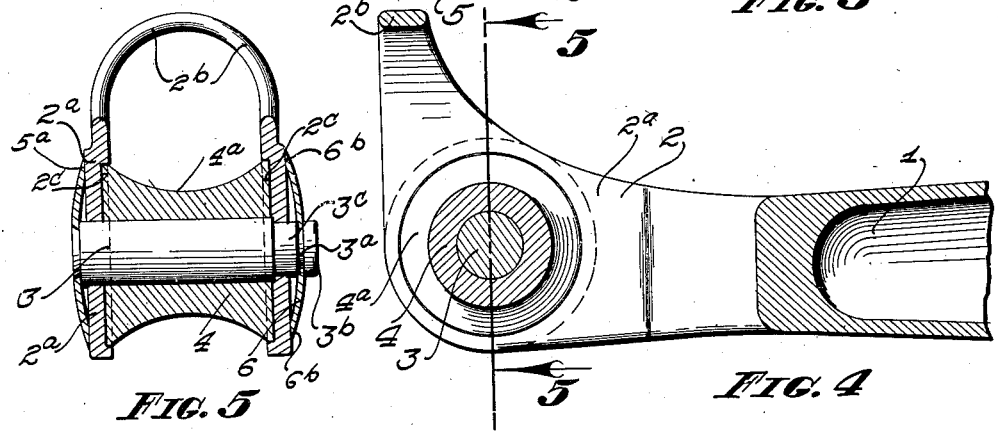
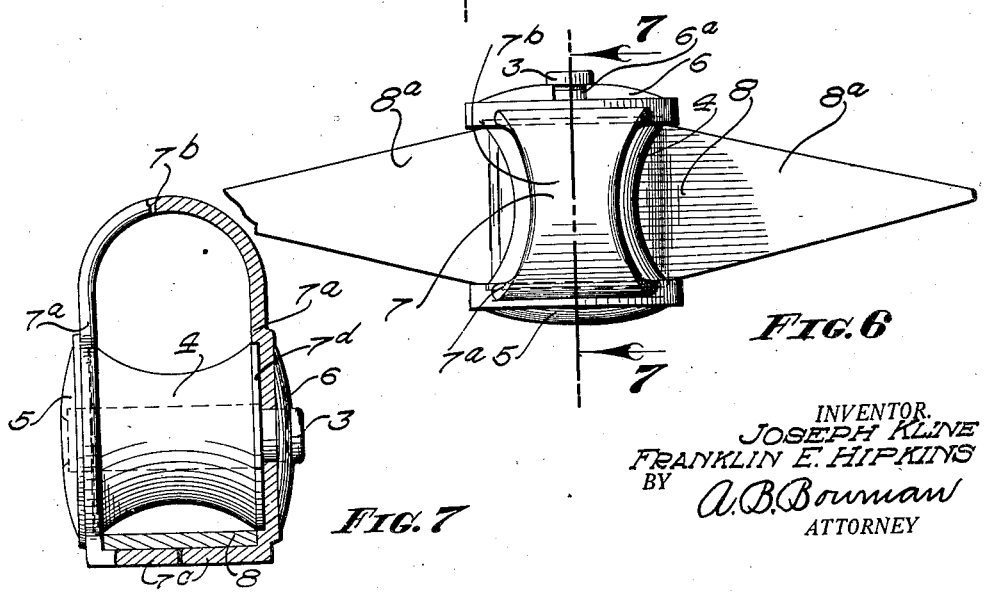
INVENTOR.
JOSEPH KLINE
FRANKLIN E. HIPKINS
BY A. B. Bowman
ATTORNEY Patented Dec. 8, 1931

1,835,310

UNITED STATES PATENT OFFICE

JOSEPH KLINE AND FRANKLIN E. HIPKINS, OF SAN DIEGO, CALIFORNIA

FISHING ROD APPARATUS

Application filed June 6, 1929. Serial No. 368,868.

Our invention relates to fishing rod apparatus, and the objects of our invention are: First, to provide an apparatus of this class which reduces wear of the fishing line to a minimum, thereby prolonging the life thereof; second, to provide an apparatus of this class whereby the fishing line passes over rollers or pulleys so as to reduce the friction upon the line with reeling in or casting; third, to provide an apparatus of this class which is so constructed that it cannot possibly shift or bind the fishing line between the pulley and frame, even though the fishing line be riding astraddle the juncture of the said pulley with its frame; fourth, to provide an apparatus of this class which may be readily assembled or disassembled for cleaning or the like; fifth, to provide an apparatus of this class which may be mounted in the conventional manner upon a fishing rod; sixth, to provide a fishing rod apparatus which is easy to manufacture, simple of construction, durable, efficient in its action and which will not readily deteriorate or get out of order.

With these and other objects in view as will appear hereinafter, our invention consists of cretain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary elevational view of a fishing rod with our apparatus shown in relation thereto; Fig. 2 is an enlarged fragmentary side elevational view of our apparatus constructed so as to fit the end of the fishing rod and showing the means for removably supporting the pulley; Fig. 3 is a still further enlarged fragmentary plan view thereof; Fig. 4 is a sectional view thereof through 4—4 of Fig. 3; Fig. 5 is a transverse sectional view thereof through 5—5 of Fig. 4, with parts and portions shown in elevation to facilitate the illustration; Fig. 6 is a top or plan view of our apparatus constructed so as to be mounted intermediate the ends of the fishing rod; and Fig. 7 is a sectional view thereof through 7—7 of Fig. 6, with parts and portions shown in elevation to facilitate the illustraton.

Similar characters of reference refer to similar parts and portions throughout the several views of the drawings.

Ferrule 1, pulley frame 2, pulley pin 3, pulley 4, end member 5, lock member 6, pulley frame 7, and pulley frame support 8 constitute the principal parts and portions of our fishing rod apparatus.

The fishing rod fitting structure A of our apparatus adapted to fit the end of the fishing rod is provided with a ferrule 1, shaped similar to the conventional fishing rod ferrule so as to fit on the end of a conventional fishing rod.

Secured to or made integral with the closed end of the ferrule which caps the end of the fishing rod, is a pulley frame 2.

The pulley frame comprises two side members 2a which diverge from the secured end of the frame 2, as shown best in Fig. 3.

The side portions 2a then extend substantially parallel with each other outwardly from their diverging portion, then upward where they are connected by a cross portion, a web 2b integral therewith. The pulley frame is thus open at its extended end, its lower side and its upper side except for the cross portion 2b.

A pulley pin 3 extends between the side portions 2a at the extended ends thereof below the cross portion 2b. Rotatably mounted upon the pulley pin 3 is a pulley 4.

The pulley is provided with a concave periphery 4a, having a relatively large radius, as shown best in Figs. 3, 5, 6 and 7.

The side portions 2a adjacent the ends of the pulley 4 are provided with recess portions 2c which receive the ends of the pulley 4 and fit the periphery of the pulley snugly, as shown best in Fig. 5.

The one end of the pin 3 which extends through the one side member 2a is provided with an end member 5, which is a disk, shaped and beveled at its periphery 5a, so that it may fit snugly against the outside of its side portion 2a. The end member 5 is permanently secured to the pin, as indicated in Fig. 5. The other end of the pin 3 is provided with a reduced portion 3c which projects through the other side portion 2a. This reduced portion 3c is provided with an annular channel 3a, leaving head portion 3b at the tip of the pin. A lock member 6 is provided which is disk-shaped with a beveled edge 6b similar to the end member 5. The lock member is provided with a slot 6a cut to its central portion which straddles the channel portion 3a of the pin 3, as shown best in Fig. 5. The end member 5 and lock 6 are preferably made of material having considerable resiliency so that the margins of the slot 6a press against the head portion 3b of the pin with sufficient force to prevent accidental movement of the lock member.

The pin 3 may be readily removed by pressing in on the end member 5 so as to move the head 3b of the pin outwardly a slight distance, thereby relieving some of the tension of the lock member 6. The lock member is then slipped off the pin, and the pin may be withdrawn so as to release the pulley 4. The side members 2a have sufficient resiliency so as to permit the pulley 4 to slip out of the recess portions 2c. As these recess portions 2c may be very shallow, little movement of the side portions 2a is necessary; therefore, they can be made relatively strong so as to keep from binding the ends of the pulley due to the pressure of the end member 5 and lock member 6.

When replacing the pulley, the operations are reversed. As the lock member 6 is disk shaped and the periphery 6a thereof tends to fit snugly against the outer surface of its side member 2a, it may be readily slipped on, although the pin may be in the position shown by the dotted lines in Fig. 5, in which the channel has partly cleared the surface of the side portion 2a. As the lock member 6 is fitted into position, the side margins of the slot 6b act as a wedge and draw the pin 3 through the side member.

In the fishing rod fitting structure B shown in Figs. 6 and 7, the pin 3, roller 4, end member 5, and lock member 6 are identical to the afore-described structure. In place of the frame 2, a pulley frame 7 is substituted, and in place of the ferrule 1, a pulley frame support 8 is substituted.

The pulley frame 7 is provided with side portions 7a, connected together at their one end by a curved cross portion 7b and abutting each other at their other end by means of inwardly extending portions 7c thereof, which extend at right angles to their respective side portions 7a, as shown best in Fig. 7. The side portions 7a of the frame 7 are provided with recess portions 7d similar to the recess portions 2b for receiving the ends of the end portions of the pulley 4, as shown in Fig. 7.

The support 8 is secured to the abutting inwardly extending end portions 7c of the pulley frame 7 between the said end portions and the pulley 4, as shown in Fig. 7. The support is provided with two tapering, extending ends which project from either side of the frame 8 in a direction transverse with the axis of the pulley 4. The end portions 8a are secured to a conventional fishing rod by wrapping suitable thread in the conventional manner, as shown in Fig. 1.

The ferrule 1 is positioned on the end of the fishing rod while the support 8 is secured to the fishing rod a short distance from the end thereof, and on the side thereof having the cross portion 2b of the frame 2.

As the pulley 4 in the end fitting A of our apparatus causes the fishing line to pass relatively close to the rod, it is necessary to position the fitting B of our apparatus quite close to the end of the fishing rod, as shown in Fig. 1, so that the fishing line F is kept from wearing on the fishing rod R even though it is bent considerably, as shown by the dotted lines in Fig. 1.

The fishing line is threaded between the roller 4 of the fitting A, and the cross portion 2b, and then passes along the one side of the fishing rod over the roller 4 of the fitting B, between said roller and the cross portion 7b. The line may then pass through conventional fishing line guide members to the reel, as it is only at the tip of the fishing rod that there is any great strain between the fishing rod fittings and the line.

In order to prevent cutting of the lines should they slip off the roller or come in contact with the frames 2 or 7, the corners of said pulley frames are rounded considerably, as shown in the several views.

In most cases, metal may be used for the rollers 4; however, if desired, it is obvious that a suitable stone, such as agate, may be substituted, thereby further reducing the friction between the line and the fitting, at the same time reducing the danger of corrosion.

Due to the edges of the rollers being recessed in the frames 2 or 7, the portions of said frames adjoining said cross portions 2b or 7b act as guards for retaining the fishing line upon the rollers without permitting wedging of the line between the rollers and their frames.

It is obvious from the construction as illustrated in the drawings and described in the foregoing specification that there is provided a fishing rod apparatus as aimed at and set forth in the objects of the invention, and though we have shown and described a particular construction, combination and arrangement of parts and portions, and a certain modification thereof, we do not wish to be limited to this particular construction, combination and arrangement, nor to the modification, but desire to include in the scope of our invention the construction, combination and arrangement substantially as set forth in the appended claims.

Having thus described our invention, what we claim as new and desire to secure by Letters Patent is:

1. The combination with a fishing rod and fishing line of a pulley frame, means of supporting said pulley frame upon said fishing rod, a pulley journalled in said pulley frame, and guard means for retaining said line upon said pulley, said guard means positioned above said pulley substantially in line with the forward extremity thereof.

2. The combination with a fishing rod and fishing line of a pulley frame, a means for supporting said pulley frame upon said fishing rod, a journal pin, a pulley journalled upon said pin, between portions of said pulley frame, tension means axially interlocked with said pin for resiliently engaging said pulley frame and preventing said frame from spreading away from said pulley.

3. The combination with a fishing rod and fishing line of a pulley frame, means for supporting said pulley frame upon said fishing rod, a journal pin, a pulley journalled upon said pin between portions of said pulley frame, end members axially interlocked with said pin for resiliently engaging said pulley frame and preventing said frame from spreading away from said pulley, one of said end members being removably connected with said pin for permitting the ready withdrawal of said pin and pulley from said pulley frame.

4. The combination with a fishing rod and fishing line of a pulley, a frame therefor provided with recesses therein for enclosing said pulley, a pin means journalling said pulley in said frame, an end member secured to said pin and engageable with one side of said frame, and lock means removably secured to the other end of said pin and engageable with the other side of said frame.

5. The combination with a fishing rod and fishing line of a pulley, a frame therefor provided with recesses therein for enclosing said pulley, a pin means journalling said pulley in said frame, an end member secured to said pin and engageable with one side of said frame, and lock means removably secured to the other end of said pin and engageable with the other side of said frame, a portion of said frame extending over said pulley and forming a loop therewith for receiving a fishing line.

6. The combination with a fishing rod and fishing line, of a pulley, side members arranged to cover the ends of said pulley, a journal pin for said pulley supported in and extending through said side members, and tension members disposed at the extremities of said journal pin and confined within the margins of said side members.

7. The combination with a fishing rod and fishing line, of a pulley, side members arranged to cover the ends of said pulley, a journal pin for said pulley supported in and extending through said side members, tension members disposed at the extremities of said journal pin and confined within the margins of said side members, and an integral guard web connecting said side members and disposed in laterally offset relation with the axis of said pulley.

8. The combination with a fishing rod and fishing line, of a pulley, a frame therefor including, side portions arranged to cover the ends of said pulley, a base member connecting said side portions at their lower edges, securing tongues projecting from said base portion, and a web connecting said side portions disposed directly above said pulley and forming therewith a loop, a journal pin for said pulley supported in and extending through said side portions, and tension members axially interlocked with said journal pin and confined within the margins of said side portions.

9. The combination with a fishing rod and fishing line, of a pulley, a frame therefor including a ferrule, a pair of side members forming a bifurcated end for said ferrule, said side members arranged to cover the ends of said pulley, and a guard web connecting said side members, said guard web disposed above said pulley in forwardly offset relation therewith, a journal pin for said pulley extending through said side members, and tension members axially interlocked with the protruding ends of said journal pin for preventing spreading of said side members.

In testimony whereof, we have hereunto set our hands at San Diego, California, this 24th day of May, 1929.

JOSEPH KLINE.
FRANKLIN E. HIPKINS.